April 12, 1966 E. O. P. TATTER ET AL 3,245,689

SPINDLE ADAPTER

Filed Sept. 24, 1963 2 Sheets-Sheet 1

INVENTORS:
Ernest O.P. Tatter
Martin C. Reed
By
Hofgren, Wegner, Allen, Stellman & McCord
Attys April 12, 1966 E. O. P. TATTER ET AL 3,245,689

SPINDLE ADAPTER

Filed Sept. 24, 1963 2 Sheets-Sheet 2

United States Patent Office 3,245,689

Patented Apr. 12, 1966

3,245,689
SPINDLE ADAPTER

Ernest O. P. Tatter, Addison, and Martin C. Reed, Roselle, Ill., assignors to Warwick Electronics Inc., a corporation of Delaware Filed Sept. 24, 1963, Ser. No. 311,936
3 Claims. (Cl. 274—10)

This invention relates to spindle adapters and, more particularly, to a spindle adapter for use with record changers and for adapting such record changers for changing large hole records by the record ejection mechanism associated with the spindle of the record changer.

It is now known in the art to have spindle adapters for record changers to adapt the record changer for handling large hole records. For many years, such adapters have embodied movable mechanisms operable by the record ejector mechanism of the small hole record spindle of the record changer which resulted in an adapter which was relatively expensive because of the number of moving parts and had a relatively short useful life because of failure of one or more of the movable parts. Quite recently, an adapter has become available in which the adapter functions to properly guide a record stack of large hole records and position the stack whereby the record ejector mechanism of the small hole record spindle on the majority of commercial record changers can engage directly with a large hole record at the bottom of a record stack and cause ejection of this record from the stack for movement onto the turntable.

An object of this invention is to provide an improved spindle adapter which permits the record ejector mechanism of the small hole record spindle to directly eject a large hole record from a record stack and which further facilitates handling and playing of records.

Another object of this invention is to provide a spindle adapter for large hole records which supports and guides a stack of large hole records whereby the ejection mechanism of the small hole record spindle of the record changer may directly change a large hole record and wherein the guiding means for the large hole record stack includes a member retractable to permit removal of records from the turntable and past the adapter without removal of the adapter from the record changer spindle.

Still another object of the invention is to provide a spindle adapter as defined in the preceding paragraph wherein the guiding member is mounted for retractable movement to permit removal of records from the turntable but is held against movement in the plane of records in the record stack to prevent shift of records in the stack as the lowermost record thereof is ejected for movement to the turntable.

A further object of the invention is to provide a spindle adapter in which the adapter guides and positions large hole records for action directly thereupon by the record ejecting member of a small hole record spindle and the body of the adapter has means at the lower part thereof rotatable with a record on the turntable and record stack removing means.

Still another object of the invention is to provide a spindle adapter usable in combination with a record changer having a small hole record spindle with a record supporting shelf and a record ejector member for shifting a record off said shelf wherein said adapter has means for guiding a large hole record stack to a support position generally at the level of said spindle shelf and the record ejector member with said means including a member permitting removal of records from the turntable but preventing lateral movement of records in the large hole record stack above the lowermost record as the lowermost record is ejected from the support position and said adapter further having means rotatable with a record on the turntable for centering of a record on the turntable and reducing frictional resistance of movement of a record with the turntable to a minimum.

Further objects and advantages will become apparent from the following detailed description taken in connection with the accompanying drawings in which.

Figures 1, 2, 3, 4:
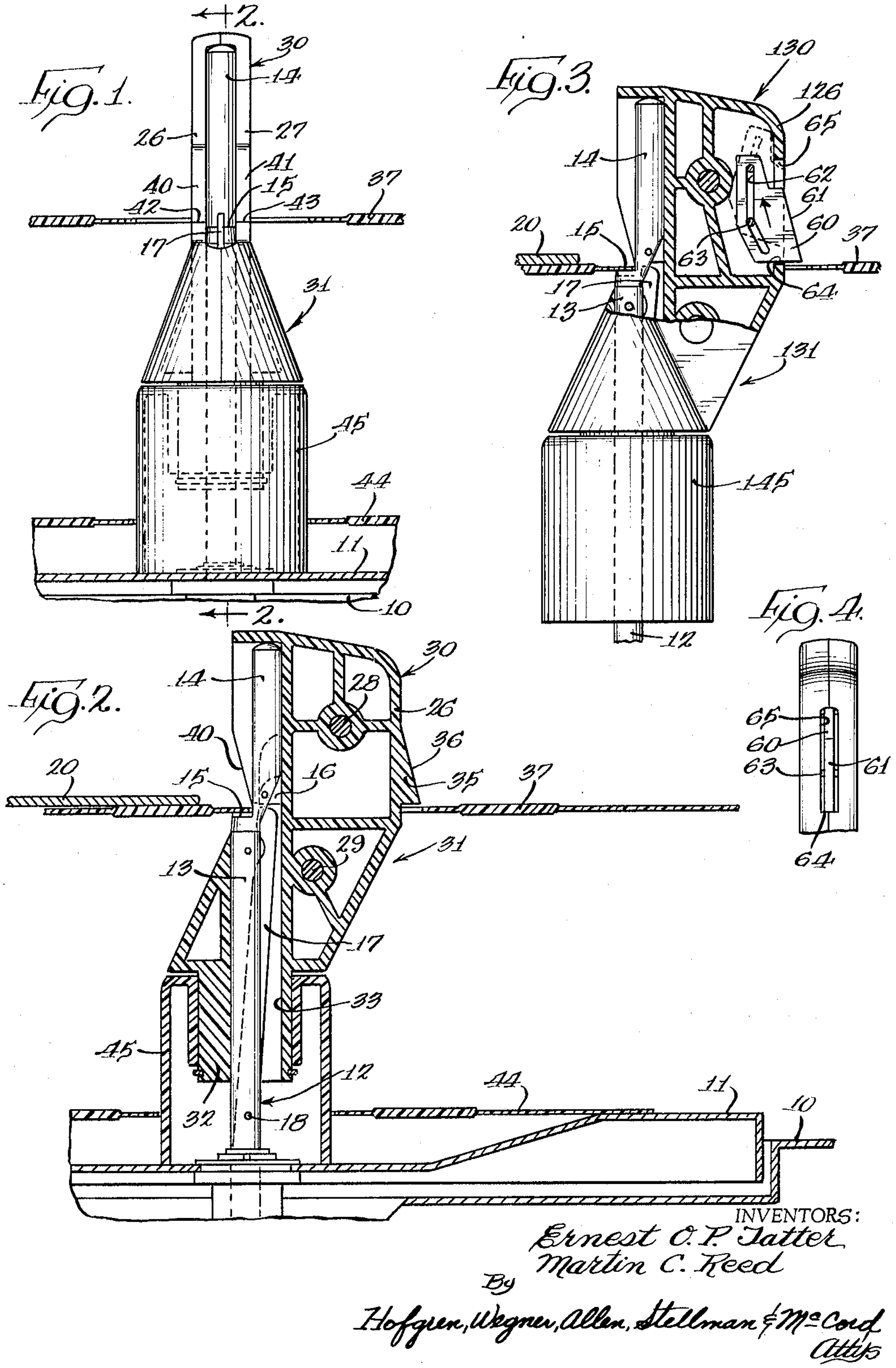
FIG. 1 is a front elevational view of a first embodiment of the spindle adapter shown in association with a record changer and a small hole record spindle and with the showing of the record changer being fragmentary and a large hole record located at a support position defined by a shelf on the adapter.
FIG. 2 is a vertical section taken generally along the line 2—2 in FIG. 1 and additionally showing the record hold-down arm of the record changer for balancing a record.
FIG. 3 is a side elevational view of a second embodiment of the spindle adapter shown in association with a small hole record spindle and with the upper part thereof shown in cross section as taken generally centrally of the adapter and with the record support position defined by the shelf of the small hole record spindle.
FIG. 4 is a fragmentary rear elevational view of the adapter shown in FIG. 3.

While this invention is susceptible of embodiment in many different forms, there is shown in the drawings and will herein be described in detail an embodiment of the invention together with modifications thereof with the understanding that the present disclosure is to be considered as an exemplification of the principles of the invention and is not intended to limit the invention to the embodiments illustrated. The scope of the invention will be pointed out in the appended claims.

The spindle adapters disclosed herein are usable with different forms of small hole record spindles, with at least two different types thereof being shown in an application of Ernest O. P. Tatter, Serial No. 220,360, filed August 30, 1962, and with the basic forms of spindle adapter for these spindles also being shown in said application. Still another form of spindle and spindle adapter is shown in the application of Fred Krahulec, Serial No. 203,686, filed June 11, 1962. Reference may be made to these copending applications for more specific details as to the small hole record spindle and record ejector mechanism associated therewith.

Generally, as shown in FIGS. 1 and 2, a record changer has a motorboard 10 rotatably mounting a turntable 11 and a small hole record spindle indicated generally at 12 extends upwardly from the motorboard and centrally of the turntable 11. This spindle is held against movement by its mounting to the motorboard.

The spindle 12 includes a stem having a lower part 13 and an upper part 14 with both parts being generally cylindrical and the upper part 14 being offset from the lower part to define a record supporting shelf 15. The record supporting shelf 15 supports a stack of small hole records, as normally used, with the upper part 14 of the spindle stem guiding the record stack onto the shelf. This guiding action is facilitated by a retractable member 16 which, as known in the art, terminates at least a record thickness above the shelf 15, so as to retain all but the lowermost record in alignment with the shelf, while still being retractable within the upper part 14 of the stem to permit easy removal of records from the turntable.

The spindle 12 also has a record ejector member which, in the form shown in FIGS. 1 and 2, comprises a lever 17 movably positioned within an elongate vertical slot formed in the lower part 13 of the spindle stem. The lever 17 is pivotally mounted to the spindle, as indicated at 18, for movement between a retracted position and a record ejecting position in which the lever 17 has moved counterclockwise, as viewed in FIG. 2, to a position in which the upper end of the lever has moved across the shelf 15 of the spindle. Normally, the lever 17 will also be mounted for a certain amount of vertical movement to cushion the lowering of the record stack onto the shelf 15.

Also, the record changer has a pressure arm 20, as shown in FIG. 2, which can either be in an inoperative position disposed to one side of the changer or in an operative position in which it rests upon the top of a record stack to balance the records supported on the spindle shelf 15. As will be later apparent, this pressure arm 20 also functions in the same manner in connection with large hole records.

The first embodiment of spindle adapter is shown in FIGS. 1 and 2 in which an adapter body is formed of two basic sections 26 and 27 which may be simply formed as molded plastic parts and which are of similar shape to be joined together by suitable means, as indicated at 28 and 29 in FIG. 2. These sections 26 and 27 together define an adapter body with an upper part indicated generally at 30, an intermediate part indicated generally at 31 and a lower part 32. The adapter body has the interior thereof shaped to fit on and receive the small record hole spindle 12 as by the formation of a passage 33 which may be generally oblong and of a size to receive the spindle stem parts 13 and 14 or formed generally as two side-by-side partially cylindrical sections with one receiving the upper stem part 14 and the other receiving the lower stem part 13.

The upper part 30 of the spindle adapter has the passage 33 opened to the exterior of the adapter and means for guiding a large hole record stack down to a support position generally at the level of the record ejector member 17 and the spindle shelf 15. This means comprises a projection 35 at the rear of the adapter having a downwardly and outwardly sloped surface 36 with the projection terminating at a height above the record stack support position at least equal to the thickness of a large hole record so that the lowermost record of a stack, as indicated by a record 37 in FIGS. 1 and 2, can be shifted from right to left as viewed in FIG. 2 by the record ejector member 17. This guiding is further facilitated by the front edges of the spindle adapter sections 26 and 27 which are cut back to extend generally parallel with the sloped surface 36, as indicated at 40 and 41, which also permits movement of the record stack to the support position.

In the embodiment shown in FIGS. 1 and 2, the support position for the record stack is defined by ledges 42 and 43 on the adapter sections 26 and 27, respectively, which together define a shelf at an elevation slightly above that of the spindle shelf 15. This relation of the spindle adapter to the spindle is maintained by the spindle adapter resting on the top of the spindle as shown in FIG. 2.

In a record changing cycle, the lowermost record 37 of a record stack is shifted to the left as viewed in FIG. 2 by the ejector member 17 and the record can then descend to the turntable free of any further obstruction to arrive at the turntable as shown by the position of record 44. Records in the record stack above the record 37 are retained against lateral movement by the fact that the projection 35 cannot move in a plane generally parallel to the plane of the stack supporting shelf so that only a single record is ejected. Once the record 37 has left the shelf the next record in the stack becomes the lowermost record and moves to the position shown for record 37 in FIGS. 1 and 2.

The record 37, once moved off its support, is guided to the turntable by the intermediate part 31 of the spindle adapter, which is formed generally conically but basically being inclined to guide a record into alignment with a right cylinder 45 which is concentric with the spindle 12. The right cylinder 45 is rotatably mounted on the lower part 32 of the spindle adapter body to rotate with minimum friction and engage within the hole of a large hole record to center the record and rotate therewith with a minimum of frictional resistance to record rotation.

In the second embodiment, as shown in FIGS. 3 and 4, adapter parts similar to those shown in the embodiment of FIGS. 1 and 2 have been given the same reference numerals, preceded by a "1" to place them in the 100 series. The second embodiment differs from that shown in FIGS. 1 and 2 by having the means for guiding the record stack to the support position constructed differently to permit removal of a record stack of records from the turntable and also in having the stack support position defined by the shelf 15 of the spindle 12. In this embodiment, the plate 60 is positioned to have a sloped surface 61 extend outwardly of the body of the adapter to function similarly to the sloped surface 36 in the first embodiment of the spindle adapter. The plate 60 is mounted for movement to a retracted position, as shown in broken line in FIG. 3, to permit unobstructed removal of the records from the turntable and over the adapter. The plate 60 is mounted to not move in a plane generally parallel to the record stack support shelf to restrain all but the lowermost record of a stack from lateral movement upon actuation of the record ejector member 17. This is accomplished by having the plate 60 formed with a slightly bowed slot 62 which mounts the plate on a pair of pins 63 fastened to the adapter body. With the plate 60 in normal position, the pin 63 is positioned intermediate the ends of the slot 62. Upward movement of this plate upon withdrawal of records from the turntable will cause inward movement of the plate by the action between the pin 63 and the lower sloped part of the slot 62. Any lateral force exerted by the record stack against the plate 60 will not result in movement of the plate 60, but the plate will function to hold the record stack in position for lowering movement onto the shelf. This is obtained by abutment of the lower edge of the plate 60 with a surface 64 on the adapter body which prevents any pivoting of the plate about the pin 63 in a direction which would be necessary to permit lateral shift of the record stack. A slot 65 is provided in the wall of the adapter body to permit the outward location and movement of the plate 60.

Figure 5:
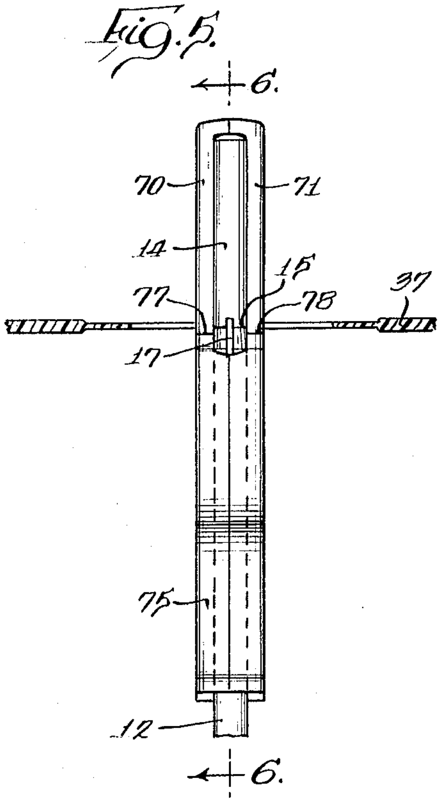
FIG. 5 is a front elevational view of a third embodiment of the spindle adapter shown in association with a small hole record spindle and with the record support position being defined by the shelf of the spindle.
Figure 6:
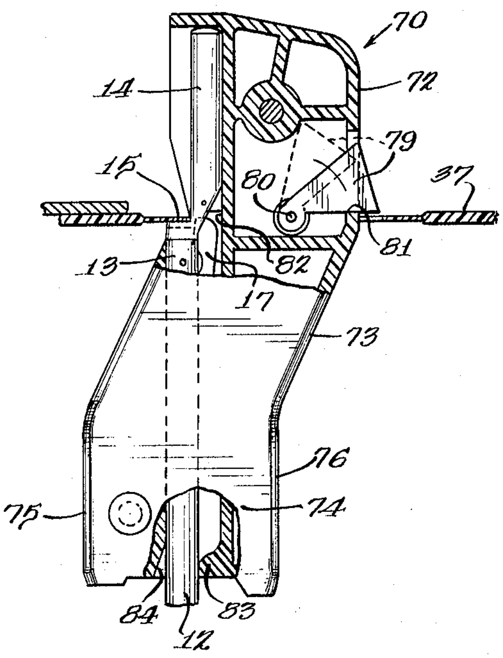
FIG. 6 is a side elevation of the adapter shown in FIG. 5 with the upper part thereof shown in section taken centrally of the adapter.

A third embodiment of the spindle adapter is shown in FIGS. 5 and 6 in which the adapter differs from the embodiment shown in FIGS. 1–3, in the external shape of the adapter and in the form of the means for guiding a record stack to the support position. In this embodiment, the spindle adapter indicated generally at 70 is formed of two sections 70 and 71 which together define a generally rectangular shape for the upper part 72 of the adapter. The adapter also has an intermediate part 73 of the adapter body and a lower part 74 which are also of generally rectangular cross section with the intermediate part 73 being inclined to guide a record passing from its support position to its position of alignment with the lower part 74 of the adapter. In this form of adapter, the lower part 74 does not rotate with a record; however, the front face 75 and opposite rear face 76, thereof are slightly curved to the same curvature as the hole of a large hole record for guiding and do not create sufficient frictional resistance to adversely affect the rotation of the record. In this embodiment, the support position for the record stack is determined by the shelf 15 of the spindle 12 with the ledges 77 and 78 of the spindle adapter being at a level beneath the shelf 15.

The adapter has a passage 82 to receive the spindle 12 with the passage having an oblong cross-section due to the offset upper spindle part 14. In order to have the adapter snugly fit the spindle and guide the adapter as it is fitted on the spindle, a fillet 83 is fitted in the passage at the lower end. The passage is also flared at 84 to facilitate threading of the adapter.

A pivoted plate 79 is provided to perform the function similar to that of the plate 60 shown in the second embodiment in FIG. 3. This plate is pivoted to the adapter body by a suitable pin, indicated at 80, with the plate being retractable to the broken line position upon withdrawal of records from the turntable. The plate 79 also functions to prevent lateral shift of records in a record stack immediately above the lowermost record by the location of the pivot pin 80 directly in line with forces exerted tending to move the plate 79 and thus prevent its movement. The plate 79 is held in position by engagement with surface 81 on the adapter body, at least at a height a record thickness above the support position for the lowermost record.

Figure 7:
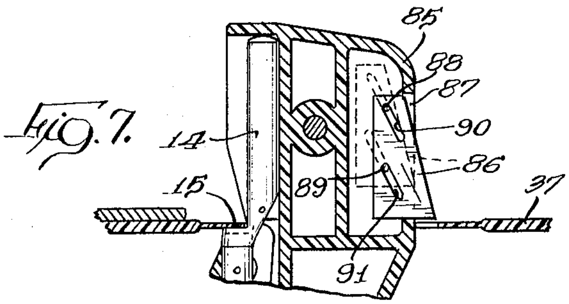
FIG. 7 is a fragmentary vertical section similar to that shown in FIG. 6 showing a fourth embodiment of the spindle adapter to the extent that it differs from the embodiment shown in FIGS. 5 and 6.

A fourth embodiment is shown in FIG. 7 in which the adapter may be of the basic form shown in the first and second embodiments of FIGS. 1–4 or in the form shown in the third embodiment of FIGS. 5 and 6, with the fourth embodiment differing from the previous embodiments in the form of the member for guiding a record stack to support position. In this form, the adapter body 85 has a plate 86 movable within a slot 87 provided in the wall of the adapter between a full line operative position and a retracted broken line position shown in FIG. 7. The plate is mounted to be easily moved to a retracted position while resisting and actually preventing lateral movement of a record stack by being prevented from movement in a plane generally parallel to the shelf 15 of the spindle by mounting the plate on a pair of pins 88 and 89. These pins are attached to the spindle adapter and extend through upwardly inclined slots 90 and 91, respectively, in the plate 86, with the slot being at an angle to permit upward movement of the plate on the pins 88 and 89 as a record is moved up from the turntable while the angle of the slots holds the plate 86 against movement toward the left as viewed in FIG. 7.

From the foregoing description, it will be seen that spindle adapters have been provided in which records can be removed from the turntable without removal of the adapter while still having an adapter which provides for changing of a record by direct engagement of a large hole record by the ejector member of the record changer spindle. Also, adapters are disclosed in which a member can rotate with a record on the turntable to maintain the record properly located on the turntable while providing minimum resistance to rotation of a record by the turntable.

We claim:

1. A spindle adapter for use with a record changer having a rotatable turntable and a stationary spindle for records having center holes of small diameter, said spindle having a shiftable ejector member, in combination, an adapter body for supporting and centering a stack of records with large diameter center holes, said body having an axially directed passage for placement on said spindle, means on the adapter body engageable with the spindle to lock the adapter to the spindle and against rotation with the turntable, means defining a support position for large hole records intermediate the top and bottom of the adapter to hold records at a support level, means at the upper part of said body for guiding the lowermost record of a large hole record stack to said support level, said means comprising a member extendable beyond the surface of the body and a mounting for the member to enable retraction of the member into the body by removal of records upwardly along the body, said adapter having a generally rectangular shape from top to bottom of a size to fit within the center hole of a large hole record, the lower end adapted to fit within the center hole of a record on the turntable, opposite convexly shaped first and second surfaces at said lower end extending arcuately for a minor part of the record hole periphery to obtain guiding of the record on the turntable with minimal frictional retardation of the record, and opposite generally straight third and fourth surfaces between said first and second surfaces and a distance apart eqaul to minor part of the hole diameter of the large hole record to avoid contact with a record hole periphery and thereby avoid frictional contact with a record on the turntable.

2. A spindle adapter for use with a record changer having a rotatable turntable and a stationary spindle for records having center holes of small diameter, said spindle having a shiftable ejector member, in combination, an adapter body for supporting and centering a stack of records with large diameter center holes, said body having an axially directed passage for placement on said spindle, means on the adapted body engageable with the spindle to lock the adapter to the spindle and against the rotation with the turntable, means defining a support position for large hole records intermediate the top and bottom of the adapter to hold records at a support level, means at the upper part of said body for guiding the lowermost record of a large hole record stack to said support level, said adapter having a generally rectangular shape of a size to fit within the center hole of a large hole record with opposite convexly shaped first and second surfaces extending arcuately for a minor part of the record hole periphery to obtain guiding of the record, and opposite generally straight third and fourth surfaces between said first and second surfaces and a distance apart equal to a minor part of the hole diameter of the large hole record to avoid contact with a record hole periphery and thereby avoid frictional contact with a record, and a rotatable member at the lower end of the body engageable within the record hole periphery of a record on the turntable.

3. A spindle adapter, in combination with a record changer, a record ejecting spindle with a shelf for supporting and centering small hole records, a record ejector member mounted for movement on said spindle and movable in a record changing operation, said adapted centering a large hole record stack for dropping of a lowermost record in the stack onto a turntable by operation of said record ejector member, said adapter having a body with a passage in said body for receiving the small hole record spindle to place the adapter in operative position, said passage opening to the periphery of the adapter body at a support position for the record stack at the level of said record ejector member, means on the body immovable in a plane transverse to the length of said passage and terminating a record thickness above said support position for guiding the lowermost record of a large hole record stack to the support position for subsequent engagement by said record ejector member and for preventing lateral movement of records in the stack above the lowermost record as the lowermost record is moved beneath said means and ejected from the support position, said last mentioned means comprising a member extendable beyond the surface of the body, and a mounting for the member permitting upward movement of the member in response to removal of records upwardly along the body.

References Cited by the Examiner

UNITED STATES PATENTS 2,884,255 4/1959 Wennerbo et al. ______ 274—10

LOUIS J. CAPOZI, *Primary Examiner.*